US005438351A

United States Patent [19]

Trenchard et al.

[11] Patent Number: 5,438,351

[45] Date of Patent: Aug. 1, 1995

[54] VACUUM PRIMING DIAGNOSTIC CARTRIDGE

[75] Inventors: Thomas J. Trenchard, Macedon; Lonnie J. Pollocks, Jr.; Donald P. Curran, Jr., both of Rochester, all of N.Y.

[73] Assignee: Xerox Corporation, Stamford, Conn.

[21] Appl. No.: 67,921

[22] Filed: May 27, 1993

[51] Int. Cl.$^{6}$ .......... G01d 21/00; B41J 2/01

[52] U.S. Cl. .......... 347/19; 347/30; 73/714; 73/726

[58] Field of Search .......... 346/1.1, 140 R; 73/726, 73/727, 714, 756; 338/4; 116/264, 266; 347/17, 19, 30

[56] References Cited

U.S. PATENT DOCUMENTS 4,506,276 3/1985 Kyser et al. .......... 346/140 R
4,518,973 5/1985 Tazaki .......... 346/140 R
4,639,738 1/1987 Young et al. .......... 346/140 R X

*Primary Examiner*—Benjamin R. Fuller
*Assistant Examiner*—Alrick Bobb
*Attorney, Agent, or Firm*—Oliff & Berridge

[57] ABSTRACT

A vacuum priming diagnostic cartridge that can be inserted in place of an ordinary ink jet cartridge to diagnose and indicate vacuum condition in an ink jet maintenance station of a printer. The diagnostic cartridge includes a manifold that communicates vacuum from the maintenance station to a vacuum detector. The detector is responsive to the amount of vacuum generated by the maintenance station during a priming operation. A detector signal from the detector is directed to an interpolating driver circuit that acts on the detector signal and provides an indication of the vacuum level sensed by outputting an output signal to activate one or more indicators.

12 Claims, 3 Drawing Sheets

VACUUM PRIMING DIAGNOSTIC CARTRIDGE

BACKGROUND OF THE INVENTION

1. Field of the Invention

The invention relates to a thermal ink jet cartridge which can be inserted in place of an ordinary ink jet cartridge to diagnose and indicate vacuum condition in an ink jet maintenance station of a printer.

2. Description of Related Art

There are no known self-contained portable devices that can quickly ascertain whether a maintenance station vacuum level meets recommended priming specifications. Current testing of maintenance station vacuum requires attaching bulky transducers and chart recorders to the printer and maintenance station. This hook-up requires trained technical personnel and is awkward and time-consuming, both to set-up and to test.

There is a need for a simple, reliable device to portably diagnose vacuum levels in a maintenance station of an ink jet printer. There also is a need for a device that quickly determines vacuum condition within a maintenance station and can be easily operated by a relatively unskilled operator.

OBJECTS AND SUMMARY OF THE INVENTION

It is an object of the present invention to provide a portable system, operable by relatively unskilled and untrained users, that indicates a pass or fail condition of vacuum level in a thermal ink jet maintenance station.

It is another object of the present invention to provide a vacuum priming diagnostic cartridge that mounts in place of a standard thermal ink jet cartridge to diagnose the vacuum level of an associated maintenance station.

The above and other objects are achieved by incorporating a vacuum transducer driver circuit and a pass/fail indicator into a portable vacuum priming diagnostic cartridge housing that is easily inserted in place of a standard ink jet cartridge.

These and other objects will become apparent from a reading of the following detailed description in connection with the drawings.

BRIEF DESCRIPTION OF THE DRAWINGS

The invention will be described in detail with reference to the following drawings wherein.

DETAILED DESCRIPTION OF PREFERRED EMBODIMENTS

Figure 1:
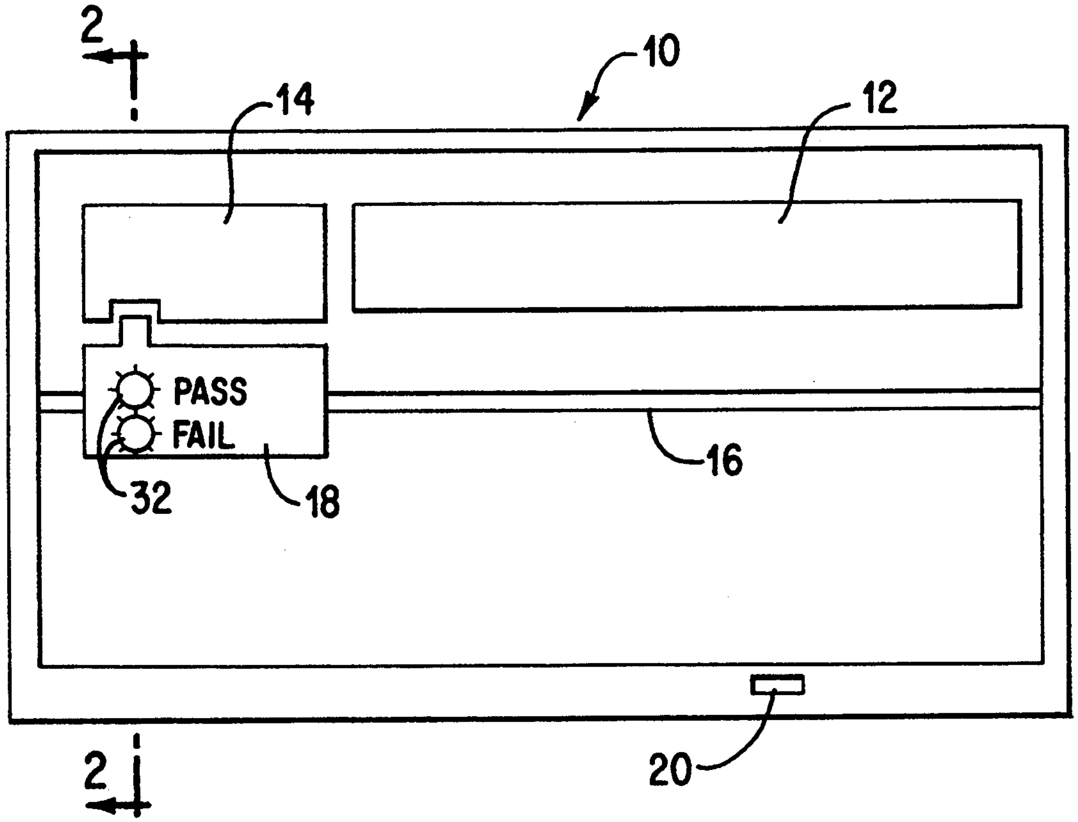
FIG. 1 is a top view of a printer showing a diagnostic cartridge according to the invention mounted in a standard ink jet cartridge location within the printer.

FIG. 1 shows a typical thermal ink jet printer 10 having a printer platen 12, a maintenance station 14 that provides priming, wiping, capping or other maintenance station functions, and scan rail 16 that provides for lateral movement of a printhead thereon across printer platen 12. A diagnostic priming vacuum cartridge 18 is located on scan rail 16 where a standard printhead cartridge is normally located and mounted. Advantageously, the diagnostic cartridge 18 is similarly shaped to the standard printhead cartridge and is provided with equivalent mounting features, allowing similar or same mounting procedures as the standard printhead cartridge. The exact cartridge structure and mounting features will vary depending on the specific printer and standard cartridge used. However, it may be advantageous to use the same cartridge housing mold as a standard printhead cartridge when making the vacuum diagnostic cartridge housing 18.

A priming button 20, or other means of actuation, within printer 10 activates maintenance station 14 to perform maintenance operations such as priming of ink jet nozzles. The maintenance station 14, upon activation, is capable of generating a vacuum that acts on the printhead nozzles of a standard cartridge as known in the art.

The vacuum must operate in a predetermined range of vacuum level to provide required priming operation. This level may change during extended operation or due to other conditional changes such as maintenance system wear or operating temperature. Specific acceptable ranges vary depending on the specific maintenance station and printhead combination used and desired standards of quality. However, these values can be easily found through routine experimentation and the operation of the maintenance station will not be described in detail because specific details of the maintenance station are not required to understand the invention.

Figure 2:
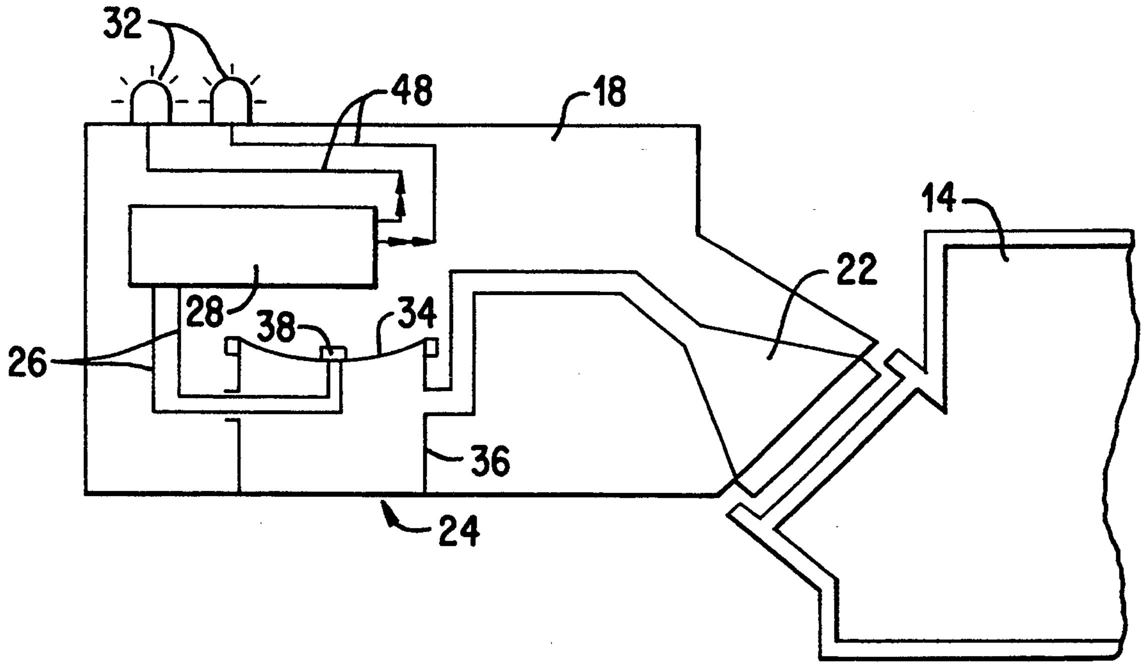
FIG. 2 is a cross-sectional view taken along line 2—2 of FIG. 1.

As better shown in FIG. 2, the diagnostic cartridge 18 includes a manifold 22 that communicates vacuum from the maintenance station 14 to a vacuum detector 24. The detector 24 is responsive to the amount of vacuum generated by the maintenance station 14 during a priming operation. A detector signal 26 of detector 24 is directed to an interpolating driver circuit 28 that acts on the detector signal 26 and provides an indication of the vacuum level sensed by outputting an output signal 48 to one or more indicators 32.

The complete diagnostic sensing circuitry and hardware, including detector 24 the interpolating driver, circuit 28, indicators 32 and associated components thereof, are contained within diagnostic cartridge 18 making the device highly portable and simple to install and operate. In a preferred embodiment, the indicators 32 may be a pair of LEDs that indicate either a "pass" or a "fail" level of vacuum. In this embodiment, the circuitry has predefined ranges or threshold values that activate output of one of the "pass" or "fail" LEDs 32 depending on the detected vacuum level. This allows for simple indication of vacuum condition within a maintenance system of a printer, readily determining the acceptability of maintenance station operation, without requiring a service call for a trained technician to diagnose the printer.

Due to the ease of operation and portability, the device can be carried by service technicians aiding in printer diagnosis without requiring handling of bulky equipment and may be provided with each printer machine. This device can also be used during manufacture of the maintenance stations to provide quality control testing.

In a preferred configuration as shown in FIG. 2, the diagnostic cartridge 18 has a manifold 22 that communicates with a source of vacuum from maintenance station 14, in a similar fashion to a standard printhead cartridge. The detector 24 includes a diaphragm 34 supported on a support cylinder 36 and a suitable detection mechanism 38 that outputs a value in response to and proportionate to the amount of deflection of diaphragm 34. The cylinder 36 is sealed from outside air and the diaphragm 34 deforms relative to the amount of vacuum generated by maintenance station 14.

Figure 3:
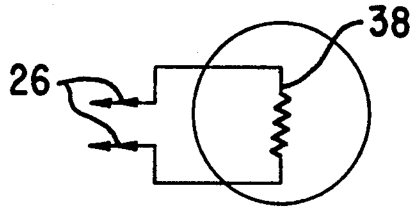
FIG. 3 is a top view of the diaphragm cylinder and strain gauge of FIG. 2.

A suitable detection mechanism to accurately measure deflection of diaphragm 34 is a strain gauge 38 mounted on top of the diaphragm 34. A preferred gauge 38 is OMEGA STRAIN GAUGE model SG-13/1000-LY11. The strain gauge 38 detects the amount of deflection and outputs detector signal 26 to interpolating driver circuit 28. FIG. 3 shows a top view of the diaphragm and strain gauge detector 24.

In operation, a standard ink jet printhead cartridge is removed and diagnostic cartridge 18 is inserted into thermal ink jet printer 10 in place of a standard ink jet cartridge, using at least some of the same mounting features. A printer priming operation is activated, such as by activating prime button 20, and the maintenance station 14 operates to prime the diagnostic cartridge 18. This priming operation generates a vacuum. The vacuum is fed to detector 24 through manifold 22 within diagnostic cartridge 18. The detector 24 sends a detector signal 26, which is proportional to the detected vacuum level, to the interpolating driver circuit 28. The interpolating driver circuit 28 outputs a driver signal 48 that is then interpolated to a "pass" LED light if the vacuum level meets priming print specification or to a "fail" LED light if the vacuum is outside of the range of vacuum print specification. The use of a pass or fail indicator allows an untrained user to reliably and readily determine the acceptability of the vacuum.

Figure 5:
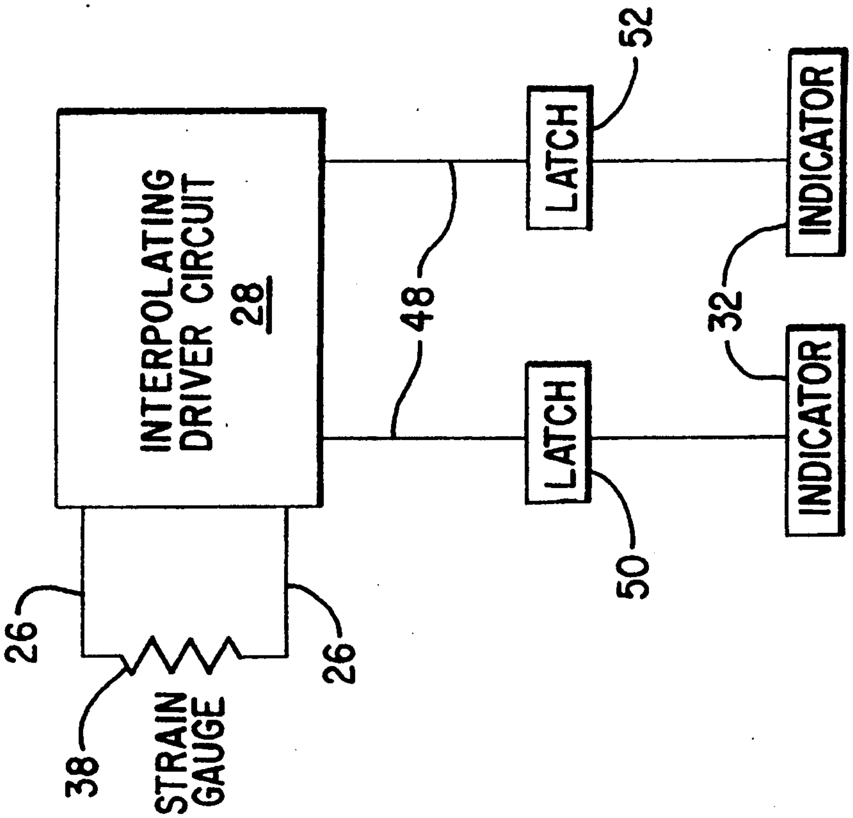
FIG. 5 is a diagram of two latches connected to the driver circuit maintaining activation of two indicators.
Figure 4:
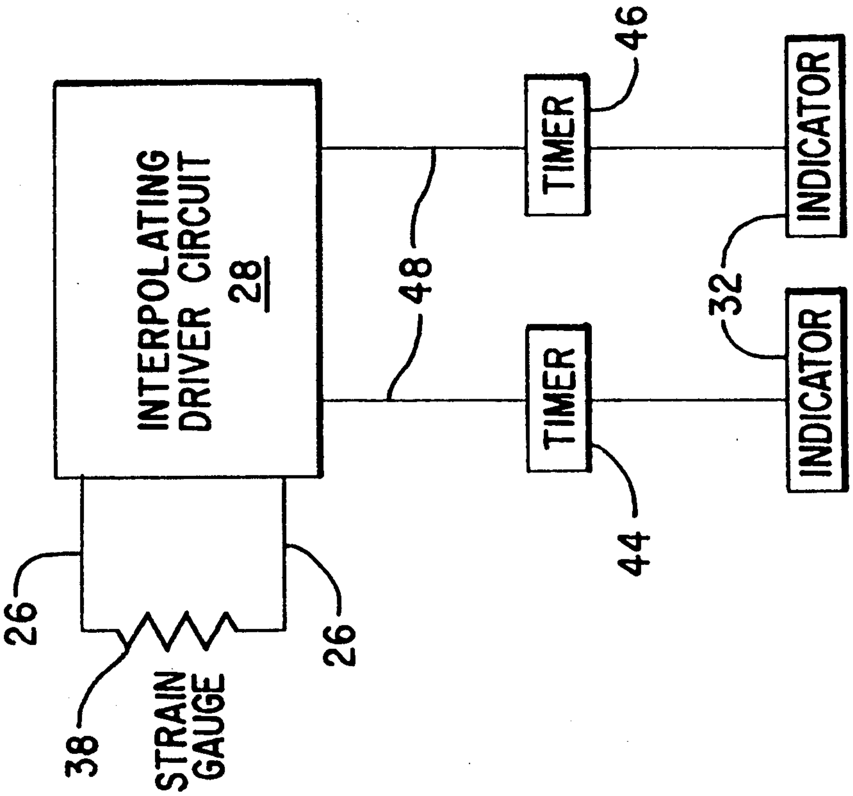
FIG. 4 is a diagram of two timers connected to the driver circuit maintaining activation of two indicators.

FIG. 4 shows the interpolating driver circuit 28 receiving the detector signal 26 from strain gauge 38 of detector 24 and connected by a driver signal 48 to timers 44 and 46 which maintain the pass/fail indicators 32. The timers 44 and 46 maintain the pass/fail indicators 32 for a sufficient time, preferably in seconds, to ensure identification by the user. Optionally, as shown in FIG. 5, the pass/fail indicators 32 may be maintained by latches 50 and 52 until the cartridge is removed.

Optionally, the pass/fail indicator 32 can be replaced with a direct numeric output such as a numeric LED display that displays actual vacuum level as measured or an analog dial gauge with appropriate markings indicating detected vacuum level. This more specific indication of vacuum level may be suitable for quality control when a more precise value is desired. However, with a substantially unskilled user, the displayed value would have to be qualified by comparison with a reference chart or other suitable ways to determine if operation of the maintenance station is within an acceptable range.

Through routine experimentation, one can derive the specific range of vacuum values that provide acceptable performance for use in determining "pass" or "fail" threshold values for the interpolating driver circuit 28 or to prepare a chart for comparison with an LED numeric display.

The invention has been described with reference to the preferred embodiments thereof, which are illustrative and not limiting. Various changes may be made without departing from the spirit and scope of the invention as defined in the appended claims.

What is claimed is:

1. A portable diagnostic vacuum cartridge for diagnosing a vacuum level during a maintenance station priming operation in a maintenance station of a printer, the printer having a standard printhead cartridge mounting fixture, the portable diagnostic vacuum cartridge comprising:

a cartridge housing mountable in the standard printhead cartridge mounting fixture within the printer;

a manifold within said housing in communication with a source of vacuum from the maintenance station during the maintenance station priming operation;

a detector within said housing responsive to the vacuum level present in said manifold, said detector outputting a detector signal corresponding to the detected vacuum level;

a driver circuit within said housing responsive to said detector signal, said driver circuit outputting an output signal; and at least one indicator responsive to said output signal for indicating the vacuum level.

2. The diagnostic vacuum cartridge of claim 1, wherein said indicator is a pass/fail indicator.

3. The diagnostic vacuum cartridge of claim 2, wherein said pass/fail indicator includes two LEDs, one of said LEDs indicating a fail condition and the other of said LEDs indicating a pass condition.

4. The diagnostic vacuum cartridge of claim 1, further comprising a timer electrically connected to said driver circuit, said timer maintaining activation of a corresponding one of said at least one indicator for a predetermined time period.

5. The diagnostic vacuum cartridge of claim 1, further comprising a latch circuit electrically connected between said driver circuit and said at least one indicator, said latch circuit maintaining activation of a corresponding one of said at least one indicator.

6. A method for diagnosing vacuum level in a maintenance station of an ink jet printer, comprising the steps of:

(a) removing a standard ink jet printhead cartridge from a mounting fixture of the printer;

(b) installing a diagnostic cartridge in the printer mounting fixture in place of the ink jet printhead cartridge, said diagnostic cartridge comprising a manifold communicable with a source of vacuum within the maintenance station, a detector responsive to vacuum levels present in the manifold, a driver circuit responsive to the detector for outputting an output signal, and an indicator responsive to the output signal for indicating detected vacuum level;

(c) activating a priming operation of the maintenance station;

(d) detecting a vacuum level value of the maintenance station by the detector within the cartridge; and (e) outputting a signal to the indicator which indicates detected vacuum level.

7. The method of claim 6, wherein step (e) includes activating one of a pass and a fail indicator based on the detected vacuum level.

8. The method of claim 6, wherein step (e) includes analyzing the detected value and outputting a signal to a pass indicator if said detected value is within a predetermined range of vacuum level.

9. The method of claim 6, wherein step (d) includes detecting vacuum level using a diaphragm responsive to vacuum present in the manifold.

10. The method of claim 9, wherein said step (d) further uses a strain gauge responsive to the diaphragm to output a detector signal to the driver circuit.

11. The method of claim 7, wherein a timer maintains activation of one of the pass and fail indicators for a predetermined time period.

12. The method of claim 6, wherein a latch circuit maintains activation of one of the pass and fail indicators until removal of the cartridge from communication with the source of vacuum.

* * * * *